United States Patent
Ying et al.

(10) Patent No.: US 9,768,851 B2
(45) Date of Patent: Sep. 19, 2017

(54) METHOD FOR OPERATING A BASE STATION IN A WIRELESS RADIO NETWORK

(71) Applicant: Sony Corporation, Tokyo (JP)

(72) Inventors: Zhinong Ying, Lund (SE); Erik Bengtsson, Eslöv (SE)

(73) Assignees: Sony Corporation, Tokyo (JP); Sony Mobile Communications, Tokyo (JP)

( * ) Notice: Subject to any disclaimer, the term of this patent is extended or adjusted under 35 U.S.C. 154(b) by 238 days.

(21) Appl. No.: 14/397,892

(22) PCT Filed: Dec. 20, 2013

(86) PCT No.: PCT/IB2013/061168
§ 371 (c)(1),
(2) Date: Oct. 30, 2014

(87) PCT Pub. No.: WO2015/092490
PCT Pub. Date: Jun. 25, 2015

(65) Prior Publication Data
US 2016/0277094 A1    Sep. 22, 2016

(51) Int. Cl.
*H04B 7/06* (2006.01)
*H04B 7/0456* (2017.01)
(Continued)

(52) U.S. Cl.
CPC ......... *H04B 7/0691* (2013.01); *H04B 7/0456* (2013.01); *H04B 7/0617* (2013.01);
(Continued)

(58) Field of Classification Search
CPC . H04B 7/0691; H04B 7/0456; H04L 41/0803; H04L 41/12; H04W 88/02; H04W 88/08
See application file for complete search history.

(56) References Cited

U.S. PATENT DOCUMENTS

| | | | |
|---|---|---|---|
| 8,838,051 B1* | 9/2014 | Su | H04B 7/0617 375/267 |
| 2007/0232341 A1* | 10/2007 | Sakata | H04L 1/0026 455/509 |

(Continued)

OTHER PUBLICATIONS

International Search Report, PCT Application No. PCT/IB2013/061168, Sep. 23, 2014.

(Continued)

*Primary Examiner* — Noel Beharry
*Assistant Examiner* — Ruihua Zhang
(74) *Attorney, Agent, or Firm* — Myers Bigel, P.A.

(57) ABSTRACT

The present invention relates to a method for operating a base station (21) in a wireless radio network. The base station (21) comprises a plurality of antennas (22) for transmitting radio frequency signals between the base station (21) and a user equipment (UE1, UE2, UE3). According to the method, at each antenna (22) a training signal sent from the user equipment at a first point in time (t1) is received and for each antenna a corresponding first configuration parameter (P1) is determined based on the training signal received at the corresponding antenna at the first point in time (t1). Furthermore, at each antenna (22) a training signal sent from the user equipment at a second point in time (t2), which is different from the first point in time (t1), is received and for each antenna (22) a corresponding second configuration parameter (P2) is determined based on the training signal received at the second point in time (t2). For each antenna (22) a corresponding predicted configuration parameter (P3) is determined based on the first and second configuration parameters (P1, P2).

13 Claims, 3 Drawing Sheets

(51) Int. Cl.
*H04L 12/24* (2006.01)
*H04W 88/02* (2009.01)
*H04W 88/08* (2009.01)

(52) U.S. Cl.
CPC .......... *H04L 41/0803* (2013.01); *H04L 41/12* (2013.01); *H04W 88/02* (2013.01); *H04W 88/08* (2013.01)

(56) References Cited

U.S. PATENT DOCUMENTS

| | | | |
|---|---|---|---|
| 2008/0212538 A1* | 9/2008 | Molisch | H04B 7/0417 |
| | | | 370/334 |
| 2009/0054093 A1 | 2/2009 | Kim et al. | |
| 2012/0033759 A1* | 2/2012 | Goransson | H01Q 3/267 |
| | | | 375/296 |
| 2012/0230380 A1* | 9/2012 | Keusgen | H04B 7/0482 |
| | | | 375/227 |
| 2013/0114468 A1 | 5/2013 | Hui et al. | |
| 2013/0244594 A1* | 9/2013 | Alrabadi | H04B 7/0413 |
| | | | 455/78 |

OTHER PUBLICATIONS

Written Opinion of the International Searching Authority, PCT Application No. PCT/IB2013/061168, Sep. 23, 2014.

\* cited by examiner

METHOD FOR OPERATING A BASE STATION IN A WIRELESS RADIO NETWORK

CROSS REFERENCE TO RELATED APPLICATION

This application is a 35 U.S.C. §371 national stage application of PCT International Application No. PCT/IB2013/061168, filed on Dec. 20, 2013, the disclosure and content of which is incorporated by reference herein in its entirety.

FIELD OF THE INVENTION

The present invention relates to a method for operating a base station in a wireless radio network, especially a method for operating a base station comprising a plurality of antennas for transmitting radio frequency signals according to a so-called multiple-input and multiple-output (MIMO) technology. The present invention relates furthermore to a base station implementing the method, and a user equipment configured to be used in connection with the base station of the present invention.

BACKGROUND OF THE INVENTION

In wireless radio frequency telecommunications, the MIMO technology (multiple input multiple output) relates to the use of multiple send and receive antennas for a wireless communication. The MIMO technology forms the basis for coding methods which use the temporal as well as the spatial dimension for transmitting information (space/time coding). Thus, a quality and data rate of a wireless connection may be increased.

A typical so-called massive MIMO system comprises a plurality of user equipments arranged within a cell served by a base station having a plurality of antennas. In a massive MIMO system location information of each of the user equipments as such may not be useful to configure the individual antenna transceivers of the base station, especially in a rich scattered environment. A rich scattered environment relates to for example street canyons of a city where a direct line of sight (LOS) between the base station and the corresponding user equipments can not be reached most of the time and radio signals between the base station and the user equipments may be reflected several times at buildings and other obstructions. Hence, the phase and the amplitude that needs to be set to the individual transceiver elements can not be calculated from the location information. Therefore, configuration of the individual transceiver elements may be based on test signals or training sequences transmitted from one user equipment while the other user equipments within the cell are silent or signals from the other user equipments are separated from the training signals by for example an orthogonal coding like CDMA. However, when a user equipment is moving, the configuration derived from the training signal may become obsolete very soon as the focus of the typical massive MIMO system may be about some tenth of the wavelength only, especially if the user equipment is arranged in a rich environment and/or has no direct line of sight to the base station. The focus can be thought of as a fading dip, but with constructive interference. When the user equipment moves out of the focus, a new configuration is needed. Therefore, the user equipment needs to resend a training signal for the antenna transceiver array at the base station to calibrate on. Hence, the frequency or interval of which the recalibrations are done determines the maximum velocity for a user equipment in such a system.

FIG. 1 shows as an example of estimated angles of arrival of radio signals received from three different user equipments in a MIMO base station having a linear antenna array of twenty antennas in a rich scattered environment. The estimated angles of arrival for the first user equipment are indicated by the symbol "x", the angles of arrival of the second user equipment are indicated by the symbol "+" and the angles of arrival of the third user equipment are indicated by the symbol "*". As can be seen, the third user equipment is located at an angle of approximately 160° and has a rather low deviation in the angle of arrival, for example because the third user equipment is arranged such that it has a direct line of sight to the base station. However, the angels of arrival of the second user equipment are more spread, having a focus near 120°. The first user equipment, which may be arranged for example at an angle of 180°, has angles of arrival spread all over the range from 0 to 180° for example due to strong scattering in the environment.

As can be seen from the above, the transceiver elements of the base station have to be reconfigured or recalibrated whenever the user equipment is moving. This requires a more frequent transmission of training signals which may reduce the overall transmission capacity within the cell.

Therefore, there is a need for an improved reconfiguration of the transceiver elements in a massive "MIMO" with moving user equipments.

SUMMARY OF THE INVENTION

According to an aspect of the present invention, a method for operating a base station in a wireless radio network is provided. The base station comprises a plurality of antennas for transmitting radio frequency signals between base station and a user equipment, for example according to the above-described MIMO technology. According to the method, at each antenna of a subset of the plurality of antennas a training signal which is sent from the user equipment at a first point in time, is received. The subset may comprise those antennas of the plurality of antennas which are arranged to receive the training signal. For example, if the antennas are arranged cylindrically, only a subset of the antennas may receive the training signal from the user equipment, whereas some other antennas may not receive the training signal. Also, if a very large antenna array is used, only a part or subset of the array of antennas may be used for a specific user equipment. However, the subset may also comprise all antennas of the plurality of antennas provided at the base station. For each antenna a corresponding first configuration parameter is determined based on the training signal received at the corresponding antenna at the first point in time. At a second point in time, which is different from the first point in time, at each antenna of the plurality of antennas a further training signal sent from the user equipment is received. For each antenna a corresponding second configuration parameter is determined based on the training signal received at the corresponding antenna at the second point in time. Then, based on the first and second configuration parameters, for each antenna a corresponding predicted configuration parameter is determined.

As described in the background section above, in a massive MIMO system the validity of the training signal or training sequence received from a user equipment will be out of date very soon if the user equipment is moving. To build a system for high mobility, more overhead for more training signals may help. According to the above-described aspects, this problem is solved by predicting a future configuration parameter set for the antennas of the base station based on at least two previously received training signals. Based on the training signals an extrapolation can be performed to predict the future configuration parameter set. Predicted configuration parameters may be used for the antenna until a next training signal is received, thus improving receiving and transmitting performance in the meantime for the uplink and downlink.

According to an embodiment, for each antenna, the corresponding predicted configuration parameter is determined based on a change between the first configuration parameter and the second configuration parameter of the corresponding antenna. For example, a derivative indicating a change from the first configuration parameter to the second configuration parameter for the corresponding antenna may be determined, and based on this derivation, a configuration parameter can be predicted for every desired point in time until a next training signal is received. Then, the method can be repeated based on the second configuration parameter and a configuration parameter derived based on the training signal received on the corresponding antenna at a point in time after the second point in time.

According to another embodiment, the corresponding predicted configuration parameter is determined as follows:

First, the first configuration parameters are arranged in a first matrix having a predetermined matrix format. The predetermined matrix format may comprise for example a two-dimensional matrix format which corresponds to a physical arrangement of the plurality of antennas of the base station. Then, the second configuration parameters are arranged in a second matrix having the predefined matrix format. In the first matrix and the second matrix a certain configuration parameter pattern is determined or searched for. This configuration parameter pattern comprises a set of configuration parameters which is arranged at a first position in the first matrix and at a second position at the second matrix. In other words, a pattern search algorithm may be used to search the first matrix and the second matrix for a moving pattern. When for example a user equipment arranged in a line of sight with respect to the base station is moving, a characteristic pattern of configuration parameters will move from one location to another location as seen from the antennas of the base station. The characteristic configuration parameter pattern may be determined such that matrix elements having at least a certain amplitude value may be considered only and the movement of this configuration parameter pattern comprising the characteristic amplitudes is searched for in the first matrix and the second matrix. Based on the movement of the configuration parameter pattern from the first position to the second position a future position of the configuration parameter pattern can be predicted and a predicted matrix having the predefined matrix format can be determined such that the configuration parameter pattern is arranged in the predicted matrix at the predicted position. The predicted matrix can be used for predicting configuration parameters for each antenna at a future point in time. Therefore, based on the assumption that the user equipment continues moving and the changes in the configuration parameters in the future will be approximately the same as in the near past, the future configuration parameters can be predicted. As the whole method can be recalibrated with each received training signal, the above assumption is admissible when for example training signals are repeated every millisecond. Considering that each configuration parameter may comprise a plurality of values, e.g. a phase and an amplitude or a plurality of such pairs, it is to be noted that the configuration parameter pattern may move in more than one direction depending on the different values. According to another example, each element of the matrix may be assigned to a corresponding antenna and each element may comprise a phase quantified into a separate 2×2 matrix. A single amplitude may additionally be assigned to each phase matrix. This may result in a multi-dimensional matrix in which for example an x- and y-dimension represent the arrangement of the antennas and an z-dimension a time discrete phase. Then, each element in this three dimensional matrix may contain an amplitude value.

The predicted configuration parameters may increase the system performance considerably. For example, considering the transmission wavelength of a commonly used telecommunication network like UMTS (universal mobile telecommunication system) or LTE (long term evolution) and a training signal every millisecond, without parameter prediction a movement of the user equipment with more than 6 kilometers per hour will decrease system performance significantly. With the above-described predicted configuration parameters, such a restriction can be removed in most cases of rich scattered environment and especially in cases where the user equipment is in a direct line of sight with respect to the base station.

According to another embodiment, for each antenna a corresponding transceiver is configured with the corresponding predicted configuration parameter for transmitting radio frequency signals between the base station and the user equipment. The term "transmitting" as it is used herein may comprise sending radio frequency signals as well as receiving radio frequency signals unless it is noted otherwise. The configuration parameters for the transceivers may be used for sending radio signals from the base station to the user equipment as well as for receiving radio signals from the user equipment. When the configuration parameters are used for sending radio signals to the user equipment, the configuration parameters enable a beam forming for the radio frequency signals. When receiving radio frequency signals from the user equipment, the predicted configuration parameters contribute to provide a constructive interference of the radio frequency signals received at the plurality of antennas thus providing a high gain and system performance.

The first and second configuration parameters may each comprise for example an amplitude information, a phase information, a parameter pair comprising an amplitude information and an associated phase information, a plurality of these parameter pairs, a signal intensity information of a signal intensity received at the corresponding antenna during receiving the training signal, or an intensity derivative information comprising a temporal derivative of the signal intensity information. Furthermore, the first and second configuration parameters may comprise other derivatives or extrapolations, for example an extrapolation of the amplitude information or the phase information.

According to a further embodiment, a training initiation signal is emitted from the base station to all user equipments arranged within a cell served by the base station or to all user equipments which are registered at the base station. The training initiation signal instructs one user equipment to send the training signal and instructs the other user equipments to stop sending radio frequency signals which may disturb the transmission of the training signal while the one user equipment sends the training signal. For example, by emitting the training initiation signal, the base station may instruct one of the user equipments to send the training signal while the other user equipments are silent. Furthermore, as another example, by emitting the training initiation signal, the base station may instruct the one user equipment and the other user equipments to use any orthogonal access method, e.g. CDMA, SDMA, TDMA or FDMA, for preventing the training signal emitted by the one user equipment from being disturbed by signals emitted from the other user equipments. Based on the received training signal from the one user equipment, corresponding configuration parameters for each antenna or each transceiver of the base station can be determined. By successively addressing each of the user equipments within the cell of the base station to provide a corresponding training signal, the base station can determine for each user equipment a corresponding configuration parameter set. Finally, the transceivers of the base station may be configured with a superposition of the configuration parameters of all user equipments.

According to another aspect of the present invention, a base station for a wireless radio network is provided. The base station comprises a plurality of antennas for submitting radio frequency signals between the base station and a user equipment. The base station comprises furthermore a processing device, for example a microprocessor or a controller, configured to receive at each antenna of the plurality of antennas a training signal sent from the user equipment at the first point in time, and to determine for each antenna a corresponding first configuration parameter based on the training signal received at the corresponding antenna at the first point in time. Furthermore, the processing device is configured to receive at each antenna of the plurality of antennas a training signal sent from the user equipment at a second point in time, wherein the second point in time is different from the first point in time. For each antenna the processing device determines a corresponding second configuration parameter based on the training signal received at the corresponding antenna at the second point in time. Based on the first and second configuration parameters, the processing device determines for each antenna a corresponding predictive configuration parameter. By predicting the configuration parameters for the antennas of the base station, the base station may receive data from the user equipment according to the above-described MIMO technology with a high performance even when the user equipment is moving fast and the environment is scattering the radio frequency signals.

According to an embodiment, the processing device determines for each antenna a corresponding configuration parameter change between the first configuration parameter and the second configuration parameter of the corresponding antenna. For each antenna the processing device determines the corresponding predicted configuration parameter based on the corresponding configuration parameter change. By predicting a future configuration parameter based on a configuration parameter change in the near past, well adapted configuration parameters for the near future can be provided even when the radio frequency signals are strongly scattered or the user equipment is moving.

According to another embodiment, the processing device arranges the first configuration parameters in a first matrix which has a predefined matrix format. For example, the predefined matrix format has a two-dimensional or a multi-dimensional matrix format corresponding to a physical arrangement of the plurality of antennas of the base station and the configuration parameters. For example, if the configuration parameter comprises a plurality of pairs of amplitude and phase, this may form a multi-dimensional pattern or matrix format. The second configuration parameters are arranged by the processing device in a second matrix having the same predefined matrix format. Then, the processing device searches for a configuration parameter pattern which is present at a first position in the first matrix and at a second position in the second matrix. Based on the first position and the second position the processing device determines a predicted position of the configuration parameter pattern for a future point in time. Based on the configuration parameter pattern and the predicted position, the processing device determines a predicted matrix having the predefined matrix format. In other words, the processing device arranges the configuration parameter pattern at the predicted position in the predicted matrix. The predicted matrix is then used by the processing device to determine for each antenna the corresponding predicted configuration parameter, which may then be used at the future point in time for receiving signals from the user equipment arranged within the cell of the base station.

Especially, when a user equipment has a direct line of sight with respect to the base station, a configuration parameter pattern which characterizes the location of the user equipment, is moving within the configuration parameter matrix described above, when the user equipment is physically moving within the cell. Assuming a continued movement of the user equipment, the characteristic configuration parameter pattern of the user equipment can be predicted in the configuration parameter matrix as described above, and therefore, the configuration parameters can be predicted appropriately, even when the user equipment is moving fast in the cell.

According to another embodiment, the base station comprises a plurality of transceivers. Each transceiver of the plurality of transceivers is associated with a corresponding antenna of the plurality of antennas. The processing device configures after the second point in time each transceiver with the corresponding predicted configuration parameter for transmitting radio frequency signals between the base station and the user equipment. The predicted configuration parameter for each transceiver may be determined continuously as described above such that an optimized configuration parameter for transmitting radio frequency signals can be continuously provided. When a further training signal is received, this further training signal may be used for further prediction of the configuration parameters, thus providing a continuous recalibration of the configuration parameters based on a training signal as well as on the prediction.

According to a further aspect of the present invention, a user equipment for a wireless radio network is provided. The user equipment is configured to transmit radio frequency signals between the user equipment and the above-described base station. In particular, the user equipment is configured to send, for example, in regular intervals of one or more milliseconds, the training signal for recalibrating the configuration parameters of the base station. Furthermore, the user equipment may provide one or more antennas and associated transceivers for enabling transmission of radio frequency signals according to the above-described MIMO technology.

Although specific features described in the above summary and the following detailed description are described in connection with specific embodiments and aspects of the present invention, it should be understood that the features of the embodiments and aspects may be combined with each other unless specifically noted otherwise.

BRIEF DESCRIPTION OF THE DRAWINGS

The present invention will now be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
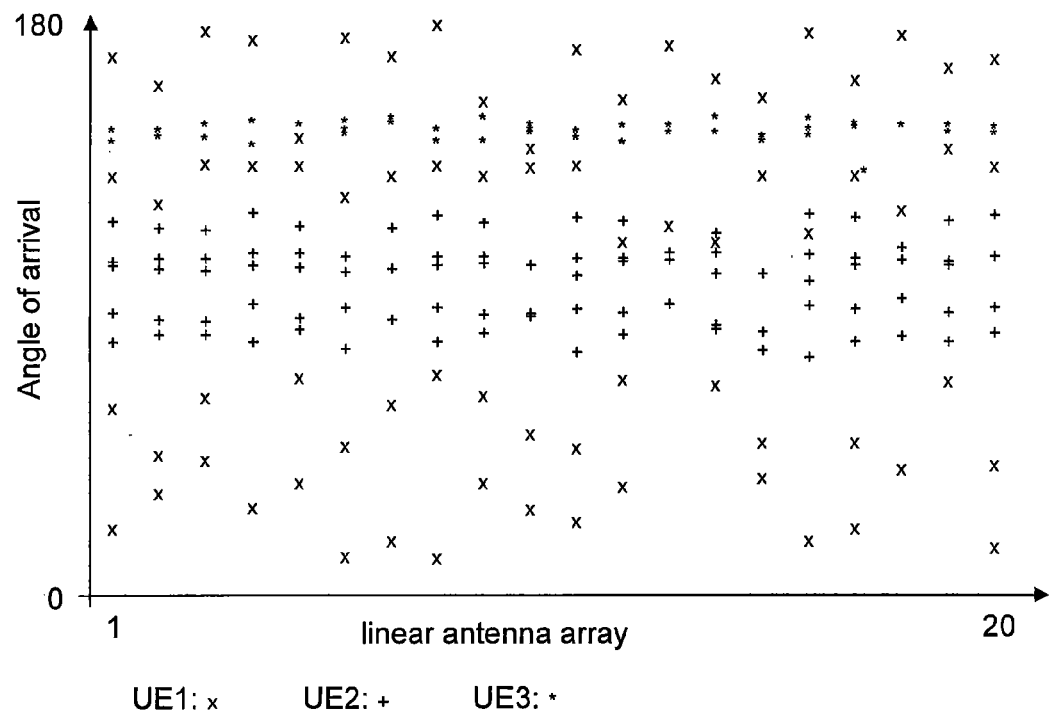
FIG. 1 shows by way of an example an angle of arrival of a signal component from three different user equipments along the position of a linear antenna array.

FIG. 1 shows an exemplary diagram indicating angles of arrival of signal components, for example the 90% strongest auto power spectrum (APS) components, of three user equipments along a linear array of antennas. The angles of arrival indicating the position of the corresponding user equipments may be derived from amplitude and phase components of radio frequency signals received from the corresponding user equipments. Due to scattering of the radio frequency signals in an environment between the user equipment and the receiving antennas of for example a base station, different angles of arrival for each user equipment may be determined as shown in FIG. 1. Such an arrangement of angles of arrival over the position along an array of antennas is also called a spatial fingerprint or footprint of the corresponding user equipment.

Figure 2:
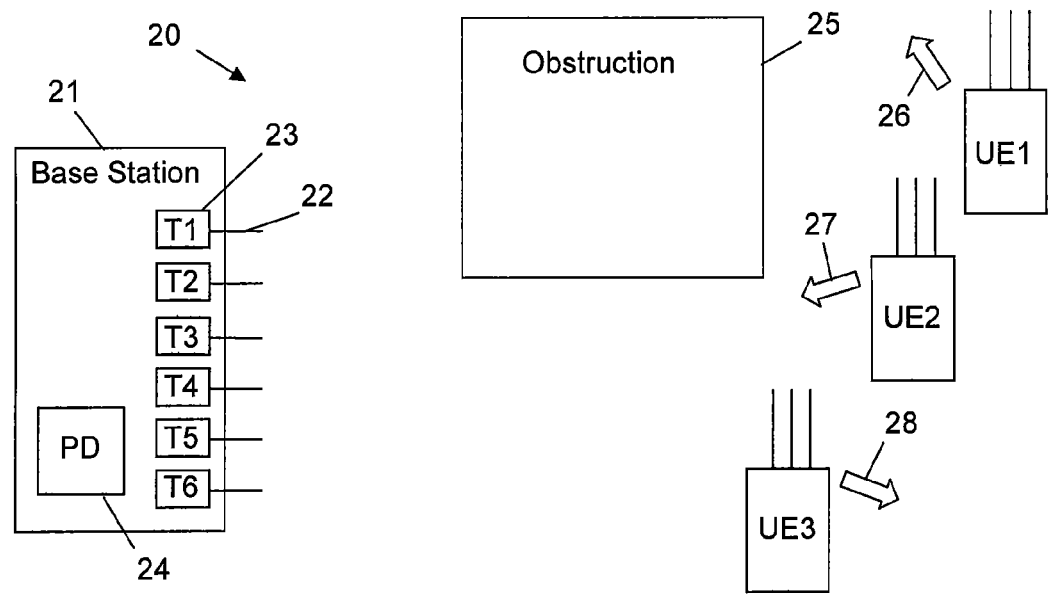
FIG. 2 shows schematically a base station and a user equipment according to embodiments of the present invention.

For a typical antenna array of for example a base station having a plurality of antennas which cooperate according to a multiple input multiple output (MIMO) system, the fingerprint of a user equipment will look different depending on the environmental scenario. FIG. 2 shows three user equipments UE1, UE2, UE3 arranged in an environment 20 of a base station 21. The base station 21 comprises a plurality of antennas 22 and associated transceivers 23, wherein in FIG. 1 only six antennas 22 and six transceivers 23 are shown for clarity reasons. However, the base station 21 may comprise for example an array of a hundred or more antennas arranged for example in a matrix. The base station 21 comprises furthermore a processing device (PD) 24 coupled to the transceivers 23 and adapted to configure the transceivers 23 for transmitting radio frequency signals between the base station 21 and the user equipments UE1, UE2 and UE3. In the environment 20 furthermore an obstruction 25, for example a building, is present. User equipment UE3 has a direct line of sight to the base station 21, i.e. a radio frequency transmission between the user equipment UE3 and the base station 21 is not disturbed or scattered by the obstruction 25. A radio frequency transmission between the user equipment UE2 and the base station 21 is at least in part influenced by the obstruction 25 and the radio frequency transmission between the user equipment UE1 and the base station 21 is heavily disturbed or scattered by the obstruction 25. Therefore, the angles of arrival of radio frequency signals of the corresponding user equipments along the antenna array at the base station 21 may be determined as shown in FIG. 1. In detail, the angles of arrival of user equipment UE1 appear more or less random, whereas the angles of arrival of user equipment UE2 are more concentrated at a few angles or angle ranges, and the angles of arrival of user equipment UE3 are even more concentrated at a certain small angle range.

For determining configuration parameter sets for the transceivers 23 in the base station 21 which provide a good transmission performance taking into account spatial information, a training signal or training sequence of radio frequency signals may be transmitted from the user equipment to the base station and corresponding configuration parameters for the transceivers 23 may be determined based on the received training signal. However, when the user equipments are moving as for example indicated by arrows 26 to 28 in FIG. 2, the configuration parameters have to be updated for each new position. An update may be performed by transmitting a further training signal and determining updated configuration parameters from the training signal in the base station 21. However, this limits the speed with which the user equipments are allowed to move without degrading transmission performance. Reducing the interval between emitting the training signals from the user equipments to the base station may reduce the overall system performance. To avoid more frequent transmissions of training signals, configuration parameters for the transceivers 23 may be predicted for points in time between two consecutive transmissions of training signals as will be described in the following in connection with FIGS. 3 to 5.

Figure 3:
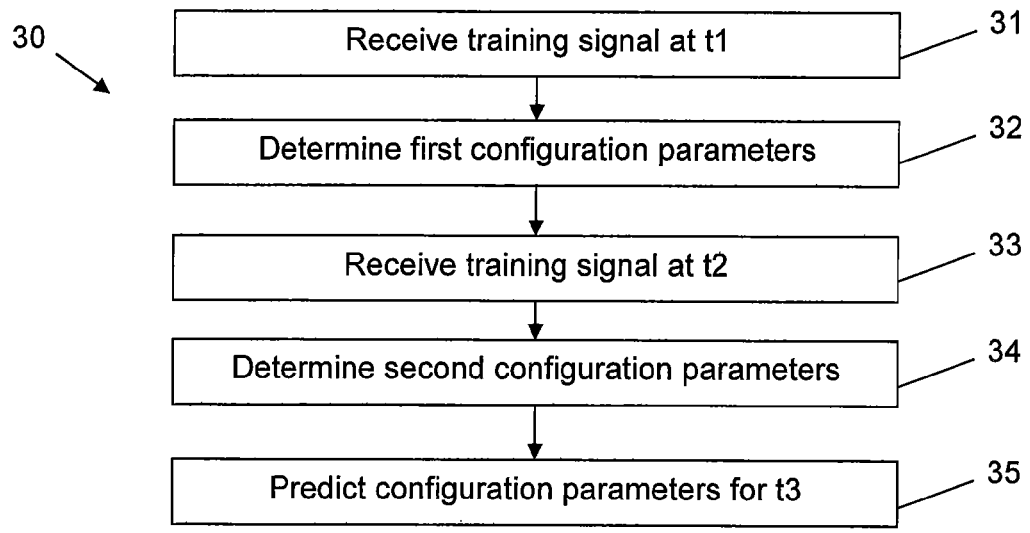
FIG. 3 shows a flowchart comprising method steps for predicting configuration parameters according to an embodiment of the present invention.

FIG. 3 shows a method 30 with method steps 31 to 35 performed in the base station 21 of FIG. 2. In step 31 a training signal from a user equipment is received at a first point in time t1. During receiving the training signal from one user equipment, for example from user equipment UE1, all other user equipments within a cell served by the base station 21 may be silent, i.e., during the time the user equipment UE1 is transmitting the training signal, the user equipment UE2 and UE3 do not transmit any radio frequency signals. This can be accomplished for example by a corresponding instruction sent from the base station 21 as a broadcast to all user equipments within the cell served by the base station 21 or by assigning dedicated time slots to each of the user equipments such that for transmitting training signals each time slot is used by one user equipment only whereas the other user equipments do not transmit any radio frequency signals during this time slot. As an alternative, signals from the other user equipments may be separated from the training signals by for example an orthogonal coding such that each user equipment can be individually distinguished. In step 32, a first set of configuration parameters for the transceivers 23 of the base station 21 are determined based on the received training signal. For example, for each transceiver 23 a corresponding configuration parameter comprising for example an amplitude and a phase value or a plurality of pairs comprising each an amplitude and a phase value may be determined. At a later point in time t2 a further training signal is received from the user equipment in step 33 and based on this training signal second configuration parameters for the transceivers 23 are determined in step 34. Based on the first and second configuration parameters determined in steps 32 and 34, predicted configuration parameters are determined in step 35 for a future point in time t3 which is after t2. The predicted configuration parameters may be used in a time interval from t2 to a point in time at which a further training signal is received from the user equipment. Then, the method 30 can repeatedly be performed for calculating predicted configuration parameters between reception of the training signals from the user equipment. This enables to improve the performance of the data transmissions in the time between receiving training signals from the user equipment when the user equipment is moving at high speed. The step 35 of predicting the configuration parameters will be explained in more detail in connection with the two approaches shown in FIGS. 4 and 5.

Figure 4:
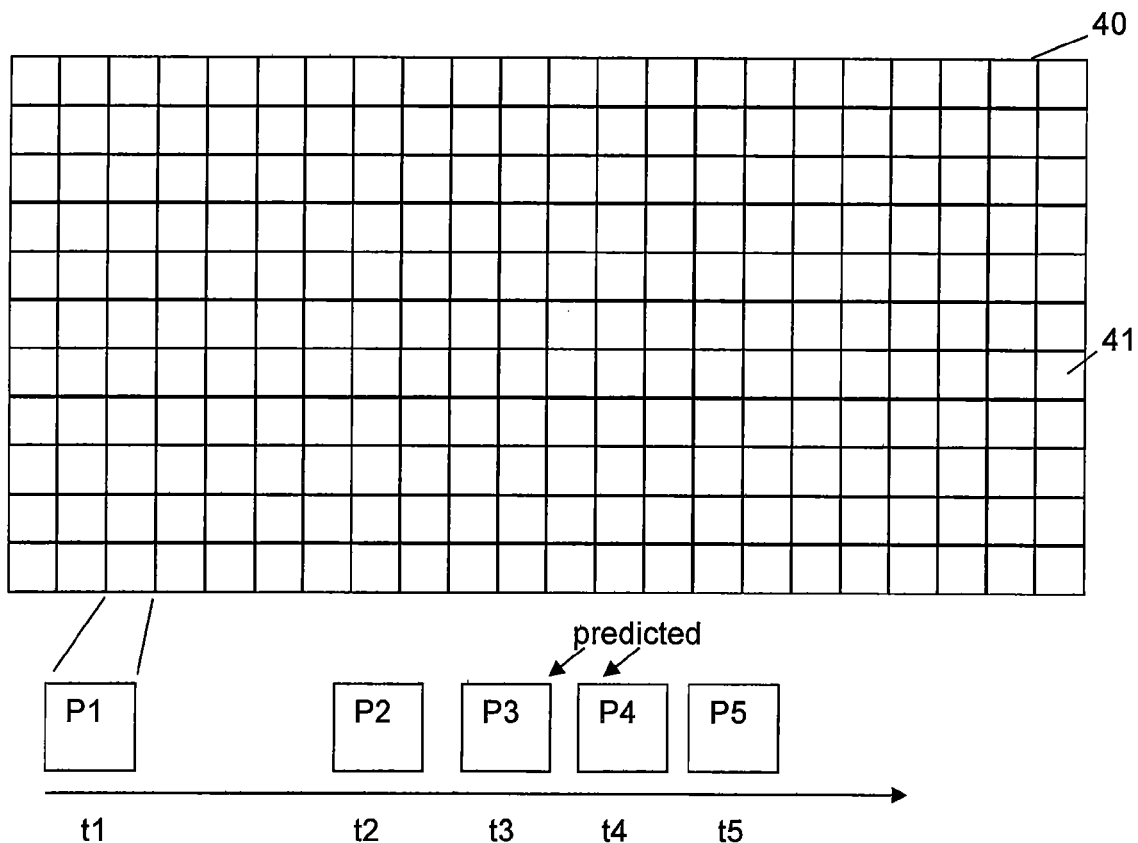
FIG. 4 shows a method for predicting configuration parameters for an antenna array according to an embodiment of the present invention.

FIG. 4 shows a matrix 40 comprising a plurality of matrix elements 41. In the example shown in FIG. 4, the matrix 40 comprises 11 rows comprising each 22 matrix elements 41 resulting in 242 matrix elements. Parameters describing the footprint of a user equipment are arranged in the matrix. For example, each matrix element may correspond to a corresponding antenna of the base station 21 and the arrangement of the matrix elements may correspond to a physical arrangement of the antenna 22 of the base station 21. The parameters assigned to each matrix element 41 may correspond to corresponding configuration parameters of the corresponding transceivers 23 of the antenna 22. For example, an intensity or amplitude and a phase may be assigned to each matrix element 41. For each matrix element 41 the parameters are tracked over time to predict the parameters. One matrix element 41 in the lowest row is shown enlarged in detail for explaining this prediction. At time t1 a parameter or a set of parameters P1 is determined based on the training signal received at t1. Next, at time t2, parameter set P2 is determined based on the training signal received at t2. Based on P1 and P2 parameter sets P3 and P4 may be predicted for future points in time t3 and t4, for example by extrapolating the parameters based on a derivative determined based on P1, P2, t1 and t2. The predicted parameters P3 and P4 may be used to update or recalibrate the configuration of the transceivers 23 of the base station 21 after t2, when the user equipment is moving. At time t5 a further training signal may be received and a corresponding parameter set P5 may be determined based on the received training signal. Parameter prediction may be performed for each user equipment individually and configuration of the transceivers 23 may comprise a superposition of the determined and predicted parameters for the individual user equipment.

Figure 5:
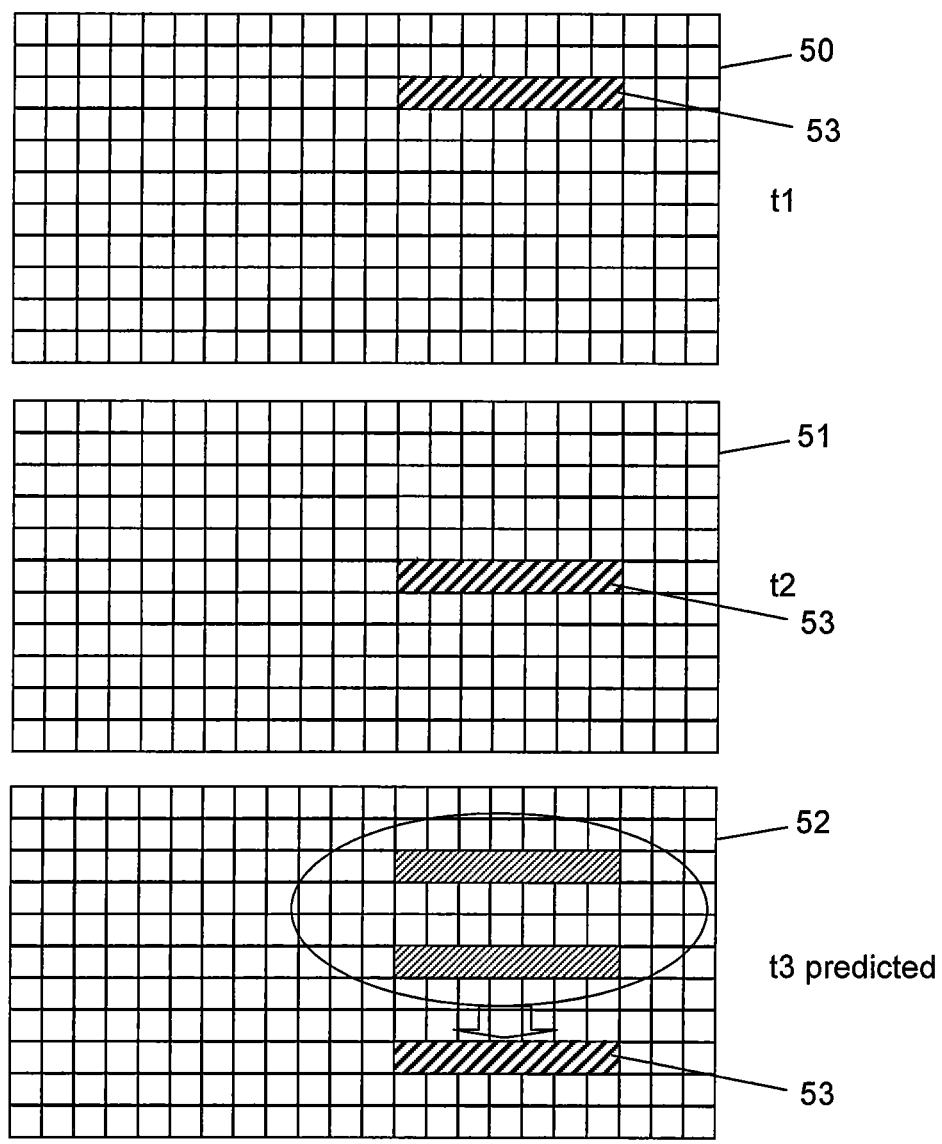
FIG. 5 shows a method for predicting configuration parameters for an antenna array according to a further embodiment of the present invention.

Another approach for predicting configuration parameters for the transceivers 23 is shown in FIG. 5. As described above in connection with FIG. 4, the parameters characterizing the footprint of a user equipment are arranged in a matrix. Especially, parameters determined based on a training signal received at t1 are arranged in a first matrix 50 and parameters determined based on a training signal received at a later point in time t2 are arranged in a second matrix 51. Next, a characteristic pattern is searched for in the first matrix 50 and the second matrix 51. Especially, when the user equipment is arranged on a direct line of sight with respect to the base station, some matrix elements will have significant values, for example a large amplitude compared to other matrix elements. In the example shown in FIG. 5, in the first matrix 50 in the third row in columns 13 to 19 such characteristic parameters are found which can also be found in the second matrix 51 in row 6, in columns 13 to 19. The arrangements of the characteristic parameters at different locations in the first matrix 50 and the second matrix 51 may result from a movement of the corresponding user equipment. Based on the location of the characteristic parameters in the first matrix 50 and the second matrix 51, a future location of the characteristic parameters at a future point in time t3 can be predicted and a corresponding predicted matrix 52 can be set up as indicated in FIG. 5. Assuming for example that the user equipment will continue its movement, the characteristic parameters may be arranged at t3 in row 9, columns 13 to 19. Algorithms for pattern recognition and for identifying how the pattern moves may be used.

The two approaches described above in connection with FIGS. 4 and 5 may be combined with each other within a single base station 21. The processing device 24 may for example perform the approach described in connection with FIG. 4 for user equipments which are not arranged within a direct line of sight to the base station and which therefore provide highly scattered radio frequency signals. On the other hand, the processing device 24 may use the approach described in connection with FIG. 5 for predicting configuration parameters for a user equipment which is arranged on the direct line of sight with respect to the base station 21.

The invention claimed is:

1. A method for operating a base station in a wireless radio network, the base station comprising a plurality of antennas for transmitting radio frequency signals between the base station and a user equipment, receiving at each antenna of a subset of the plurality of antennas a training signal sent from the user equipment at a first point in time, determining for each antenna of the subset a corresponding first configuration parameter for uplink transmission based on the training signal received at the corresponding antenna at the first point in time, receiving at each antenna of the subset of the plurality of antennas a training signal sent from the user equipment at a second point in time which is different from the first point in time, determining for each antenna of the subset a corresponding second configuration parameter for uplink transmission based on the training signal received at the corresponding antenna at the second point in time, and determining for each antenna of the subset a corresponding predicted configuration parameter based on the first and second configuration parameters, wherein the determining for each antenna of the subset the corresponding predicted configuration parameter comprises:

arranging the first configuration parameters in a first matrix having a predefined matrix format, arranging the second configuration parameters in a second matrix having the predefined matrix format, determining a configuration parameter pattern based on the first matrix and the second matrix, the configuration parameter pattern comprising a set of configuration parameters which is arranged at a first position in the first matrix and at a second position in the second matrix, determining a predicted position of the configuration parameter pattern based on the first position and the second position, determining a predicted matrix having the predefined matrix format based on the configuration parameter pattern and the predicted position, and determining for each antenna of the subset the corresponding predicted configuration parameter based on the predicted matrix.

2. The method according to claim 1, wherein determining for each antenna of the subset the corresponding predicted configuration parameter comprises:
- determining for each antenna of the subset a corresponding configuration parameter change between the first configuration parameter and the second configuration parameter of the corresponding antenna, and
- determining for each antenna of the subset the corresponding predicted configuration parameter based on the corresponding configuration parameter change.

3. The method according to claim 1, wherein the predefined matrix format comprises a multi-dimensional matrix format which corresponds to a physical arrangement of the antennas.

4. The method according to claim 1, further comprising after the second point in time:
- configuring for each antenna of the subset a corresponding transceiver with the corresponding predicted configuration parameter for transmitting radio frequency signals between the base station and the user equipment.

5. The method according to claim 1, wherein the first and second configuration parameters each comprise at least one of a group consisting of:
- an amplitude information,
- a phase information,
- a parameter pair comprising an amplitude information and an associated phase information,
- a plurality of the parameter pairs,
- a signal intensity information of a signal intensity received at the corresponding antenna during receiving the training signal, and
- an intensity derivative information comprising a temporal derivative of the signal intensity information.

6. The method according to claim 1, further comprising:
- emitting a training initiation signal from the base station, the training initiation signal instructing the user equipment to send the training signal and instructing other user equipments to stop sending radio frequency signals which may disturb a transmission of the training signal while the user equipment sends the training signal.

7. A base station for a wireless radio network, comprising:
- a plurality of antennas for transmitting radio frequency signals between the base station and a user equipment,
- a processing device configured to:
- receive at each antenna of a subset of the plurality of antennas a training signal sent from the user equipment at a first point in time,
- determine for each antenna of the subset a corresponding first configuration parameter for uplink transmission based on the training signal received at the corresponding antenna at the first point in time,
- receive at each antenna of the subset of the plurality of antennas a training signal sent from the user equipment at a second point in time which is different from the first point in time,
- determine for each antenna of the subset a corresponding second configuration parameter for uplink transmission based on the training signal received at the corresponding antenna at the second point in time,
- arrange the first configuration parameters in a first matrix having a predefined matrix format,
- arrange the second configuration parameters in a second matrix having the predefined matrix format,
- determine a configuration parameter pattern based on the first matrix and the second matrix, the configuration parameter pattern comprising a set of configuration parameters which is arranged at a first position in the first matrix and at a second position in the second matrix,
- determine a predicted position of the configuration parameter pattern based on the first position and the second position,
- determine a predicted matrix having the predefined matrix format based on the configuration parameter pattern and the predicted position, and
- determine for each antenna of the subset a corresponding predicted configuration parameter based on the predicted matrix.

8. The base station according to claim 7, wherein the processing device is configured to:
- determine for each antenna of the subset a corresponding configuration parameter change between the first configuration parameter and the second configuration parameter of the corresponding antenna, and
- determine for each antenna of the subset the corresponding predicted configuration parameter based on the corresponding configuration parameter change.

9. The base station according to claim 7, wherein the predefined matrix format comprises a two-dimensional matrix format which corresponds to a physical arrangement of the antennas.

10. The base station according to claim 7, further comprising a plurality of transceivers, wherein each transceiver of the plurality of transceivers is associated with a corresponding antenna of the plurality of antennas, wherein the processing device is configured to configure, after the second point in time, each transceiver with the corresponding predicted configuration parameter for transmitting radio frequency signals between the base station and the user equipment.

11. The base station according to claim 7, wherein the first and second configuration parameters each comprise at least one of a group consisting of:
- an amplitude information,
- a phase information,
- a parameter pair comprising an amplitude information and an associated phase information,
- a plurality of the parameter pairs,
- a signal intensity information of a signal intensity received at the corresponding antenna during receiving the training signal, and
- an intensity derivative information comprising a temporal derivative of the signal intensity information.

12. The base station according to claim 7, wherein the base station is configured to emit a training initiation signal, the training initiation signal instructing the user equipment to send the training signal and instructing other user equipments to stop sending radio frequency signals which may disturb a transmission of the training signal while the user equipment sends the training signal.

13. A user equipment for a wireless radio network, wherein the user equipment is configured for transmission of radio frequency signals between the user equipment and the base station according to claim 7.

* * * * *

UNITED STATES PATENT AND TRADEMARK OFFICE
CERTIFICATE OF CORRECTION

Page 1 of 1

PATENT NO. : 9,768,851 B2
APPLICATION NO. : 14/397892
DATED : September 19, 2017
INVENTOR(S) : Zhinong Ying et al.

It is certified that error appears in the above-identified patent and that said Letters Patent is hereby corrected as shown below:

On the Title Page

Item (73), Assignee: Please correct "Sony Mobile Communications, Tokyo (JP)" to read -- Sony Mobile Communications Inc., Tokyo (JP) --

Signed and Sealed this
Sixteenth Day of October, 2018

Andrei Iancu
*Director of the United States Patent and Trademark Office*